April 26, 1960 G. D. HULST 2,934,653
READOUT SYSTEM
Filed March 7, 1957
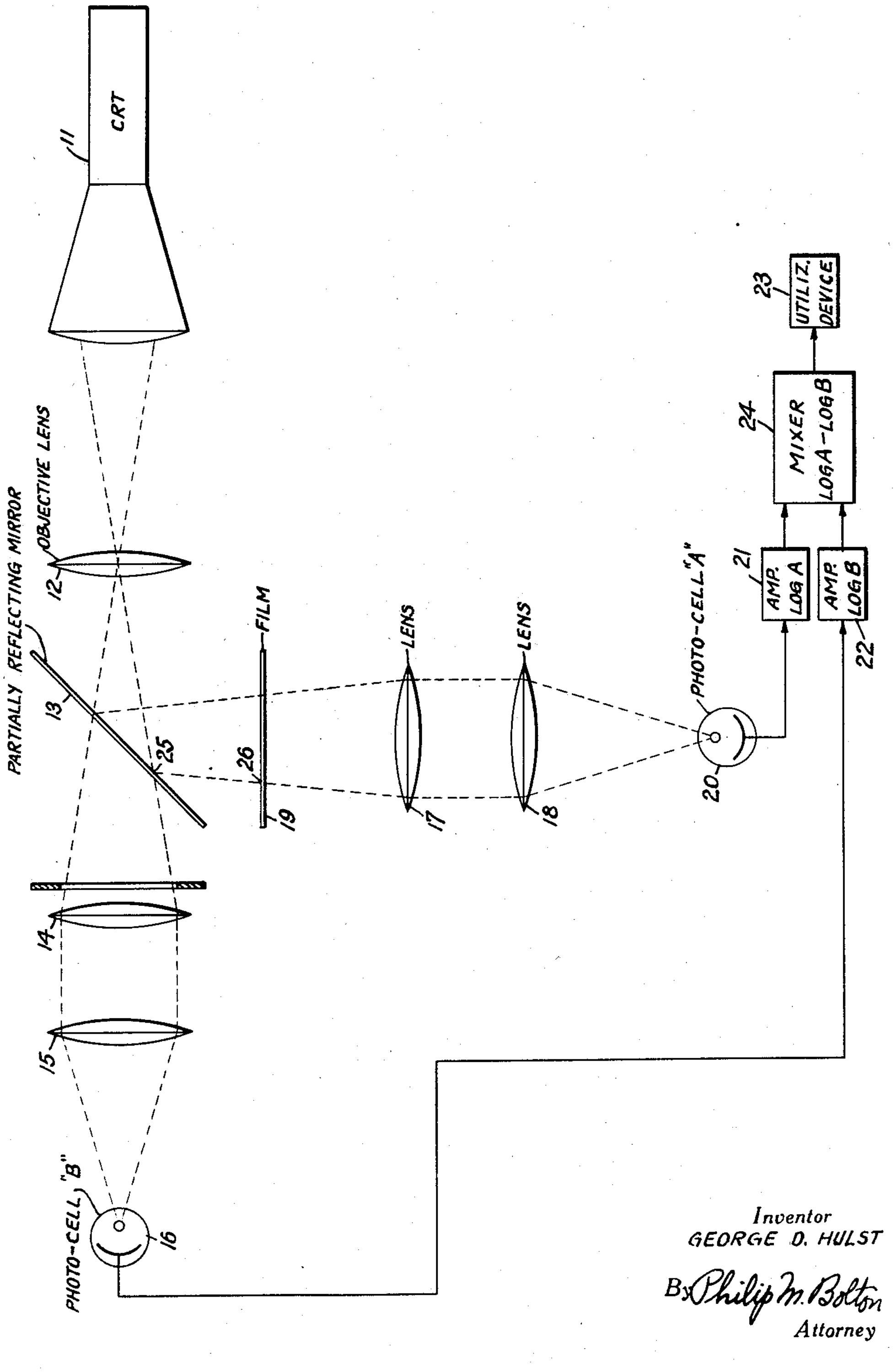
Inventor
GEORGE D. HULST
By Philip M. Bolton
Attorney

United States Patent Office 2,934,653

Patented Apr. 26, 1960

2,934,653

READOUT SYSTEM

George D. Hulst, Upper Montclair, N.J., assignor to International Telephone and Telegraph Corporation, Nutley, N.J., a corporation of Maryland Application March 7, 1957, Serial No. 644,686

6 Claims. (Cl. 250—220)

This invention deals with readout systems and in particular with a system where the readout arrangement uses a source of light, such as a flying spot scanner, for the readout operation.

In the art of reading out information from some storage medium such as a film, a source of light such as a flying spot scanner is used to produce signals in combination with some light sensitive detecting means. Since the light sensitive detecting means produces signals in accordance with the intensity of the light which is passed through the storage medium, it becomes apparent that the source of light should give off a uniform emission. In other words, if the light emission source varies in its intensity, the detector may produce a signal which indicates that there is a dark spot present on the storage medium when in point of fact the spot is not dark but the lack of light being received at the detector is due to the drop off of the emission at the source of light. This condition is especially true when the source of light is a cathode ray tube in which the phosphor on the face of the tube causes variations in the intensity of the light transmitted therefrom. The problem has been recognized and at least one solution has been offered by way of designing a feedback circuit arrangement. In the feedback circuit arrangement mentioned above, as the light falls below some level, a signal is fed back to the control elements of the source of light to cause an intensification, and in the reverse manner if the light intensity goes above a certain level, the feedback circuit lowers the intensity of the source. As in all feedback circuits, this arrangement inherently requires a certain time delay and such time delay may be sufficient to cause an erroneous readout in a high speed scanning operation.

It becomes clear that in the art of reading out from a light source it would be desirable to provide a means whereby the output of the readout system to a utilization device would be compensated for directly, in accordance with the variation of the light source, and without any inherent time delay.

It is therefore an object of this invention to provide an improved circuit in a readout system for compensating for variations in the emission from a light source.

It is a further object of this invention to provide a system for directly compensating for non-uniform light emission in a readout system and without any inherent time delay.

In accordance with the objects above, the invention features a means for dividing the light emitting from a source of light into two paths, whereby the storage medium is disposed in one path and in each path there is also disposed a light sensitive detecting device. To each of the light sensitive detecting devices there is coupled a circuit for converting the signals therefrom into logarithmically valued signals and combining these signals to correct the signal which comes from the light being passed through the film in accordance with the variation of the intensity of the light emitted from the source.

The above mentioned and other features and objects of this invention will become more apparent by reference to the following description taken in conjunction with the drawing, which is a schematic block diagram of a film readout system.

In the drawing there is a cathode ray tube 11 which serves as the source of light for the readout system. Lens 12 and partial reflecting mirror 13 are disposed to have the light rays emitted from the cathode ray tube 11 to be partially passed therethrough and partially reflected thereat. Lens 14 and 15 are disposed to pass the light rays transmitted through the mirror 13 to photocell B (16). Lens 17 and 18 are disposed to pass the light rays passing through the film 19 to photocell A (20). Amplifiers 21 and 22 are respectively coupled to the photocells 20 and 16. Utilization device 23 is coupled to the substraction circuit 24 which is in turn coupled to the amplifiers 21 and 22. The operation of the device will become clearer in the light of the following discussion.

Let us assume in connection with the drawing that there is some data information contained on the film 19. The purpose of the readout system shown in the drawing is to extract from this film the information contained thereon. It is clear that the storage medium need not be a film but could be some other medium for which a readout from light sources is effected, such as a punch card. Assuming that the instant data storage medium is a film, the purpose of the photocell A (20) is to detect the light transmission characteristics of the film. A beam of light is passed from the cathode ray tube 11 through the objective lens 12 to the partial reflecting mirror 13 whereat the light beam is divided into two parts directed along two paths. Part of the light beam is reflected by the mirror 25 and is passed through the film 26 to and through the lens 17 and 18 for a refraction operation and on to photocell A (20). As the light is passed through the film 26, a certain portion is absorbed and a certain portion is passed on. The photocell A (20) having experienced the reception of a certain portion of the light energy produces a signal representative of the amount of energy received, which is passed on to the amplifier 21. Concurrently with this operation the other portion of the original light beam is passed from point 25 through the two lens 14 and 15 to the photocell B (16). From photocell B (16) there is passed a signal to the amplifier 22 in accordance with the light energy received thereat. At amplifiers 21 and 22 each of the signals is amplified in such a fashion that the outputs therefrom are in the form of logarithmic values of the input signals. The two logarithmic valued signals are passed to the subtraction circuit 24 where they are subtracted to effectively produce a ratio or division, and a signal having been modified by this ratio, is passed on to the utilization device 23.

To make the operation of the device more meaningful, let us assume that there is transmitted from the cathode ray tube 100 arbitrary units of light energy. Let us further assume that the partial reflecting mirror 13 will pass directly through 20% of the light energy striking the mirror and will reflect 80% of the light energy striking the mirror. Let us make one further assumption, for case 1, that there is a white spot on the film. Having transmitted 100 units of light energy to the mirror, 20 units will pass to photocell B (16) and 80 units will pass through the film 19 (none being absorbed at the white spot) on to photocell A (20). The signals from 16 and 20 after being mathematically manipulated in the amplifiers at 21 and 22 and the subtraction circuit 24 will result in a division of $$\frac{80}{20}=4$$

If we were reading a spot on the film which was similarly white to the one read in the first part of our hypothetical, but the output of the cathode ray tube instead of being 100 units was 80 units, it is clear that without some compensation operation we would not get the same output to the utilization device 23. However, if we follow the operation as above with our compensating circuit for an original emission of 80 units of energy, we would find that 16 units of energy will be passed to photocell B (16) and 64 units of energy will be passed to photocell A (20). The division of $$\frac{64}{16}=4$$

is identical to the division answer arrived at when the cathode ray tube was emitting 100 units and it is obvious that regardless of the intensity of the emission of light from the cathode ray tube the signal output will be compensated for to give a correct reading of the data on the film.

In accordance with the discussion above other values can be assumed for a dark spot on the film, and the ratio or correction factor worked out from these values, and it will be clear that the circuit compensates as described above.

The amplifiers shown by blocks at 21 and 22 can be of the variety described in sections 17–116 or 17–100 of the text "Television Engineers' Handbook" by D. Fink, published by McGraw-Hill, 1957, and the subtraction circuit shown at 24 can be any well-known subtraction circuit, such as a resistive Y network with a phase inverter in one arm thereof.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a readout system having a light source for extracting data from a storage medium, an arrangement for compensating for non-uniform emission from said light source comprising a source of light, means for passing the light from said source along a main path, means for dividing the light passing along said main path into a first and second path, first and second light sensitive means respectively disposed in each of said first and second paths to respectively receive said transmitted light and produce signals in accordance with the light received, an information readout and data storage medium disposed in said second path of said transmitted light between said second light sensitive means and said light source, and means including a subtraction circuit for applying the signal from said first light sensitive means to correct the signal from said second light sensitive means in accordance with variations in the intensity of light emitted by said source.

2. In a readout system having a light source for extracting data from a storage medium, an arrangement for compensating for non-uniform emission from said light source comprising a source of light, means for passing the light from said source along a main path, means for dividing the light passing along said main path into a first and second path, first and second light sensitive means respectively disposed in each of said first and second paths to respectively receive said transmitted light and produce signals in accordance with the light received, an information readout and data storage medium disposed in said second path of said transmitted light between said second light sensitive means and said light source, and signal correction means for effectively dividing in a constant ratio the signal from said second light sensitive means by the signal from said first light sensitive means to correct the signal from said second light sensitive means in accordance with the variation in the intensity of the light emitted by said source.

3. A readout system according to claim 2, wherein the means for effectively dividing said signals includes a first and second amplifying means, whose output is logarithmic in value, coupled respectively to said first and second light sensitive means, for converting the signals therefrom into logarithmic valued signals, and mixer means coupled to said first and second amplifying means for subtracting the signals transmitted therefrom to obtain said effective division.

4. In a readout system having a cathode ray tube as a light source for extracting data from a storage medium, an arrangement for compensating for non-uniform light emission which results from the phosphor variations on the face of said cathode ray tube comprising a cathode ray tube, means for passing the light from said cathode ray tube a main path, means to divide said light passing along said main path into a said first and second path, a first and second light sensitive means respectively disposed in each of said paths to respectively receive said transmitted light and produce signals in accordance with the light received, an information readout and storage medium disposed in said second path of said transmitted light between said cathode ray tube and said second light sensitive means and means including a subtraction circuit for applying the signal from said first light sensitive means to correct the signal from said second light sensitive means in accordance with the variations of intensity of light emitted by said cathode ray tube.

5. A readout system arrangement according to claim 4, wherein the means for passing the light along a first and second path includes a partially reflecting mirror which passes a first part of the incident light transmitted thereto and reflects a second part of the incident light transmitted thereto.

6. In a flying spot scanner readout arrangement, a system for compensating for the non-uniform emission of light from the flying spot scanner tube comprising a flying spot scanner tube, a light reflecting means for passing a first part and reflecting a second part of the incident light transmitted thereto, a first and second light sensitive means disposed to respectively receive said first and second parts of said transmitted light for producing signals in accordance with the light received, a data storage medium disposed in the path of said second part of said transmitted light between said second light sensitive means and said reflecting means, first and second amplifying means whose output is logarithmic in value coupled respectively to said first and second light sensitive means for converting the signals therefrom into logarithmic valued signals, and mixer means coupled to said first and second amplifying means for subtracting the signals transmitted therefrom to obtain an output which has been corrected in accordance with the variations in the intensity of light emitted by said flying spot scanner tube.

References Cited in the file of this patent

UNITED STATES PATENTS

| | | |
|---|---|---|
| 2,142,378 | Sachtleben | Jan. 3, 1939 |
| 2,188,679 | Dovaston et al. | Jan. 20, 1940 |
| 2,510,347 | Perkins | June 6, 1950 |
| 2,659,828 | Elliott | Nov. 17, 1953 |
| 2,719,247 | Bedford | Sept. 27, 1955 |
| 2,780,131 | Lanneau et al. | Feb. 5, 1957 |